(12) United States Patent
Nishikawa et al.

(10) Patent No.: US 9,515,498 B2
(45) Date of Patent: Dec. 6, 2016

(54) CHARGING CABLE

(71) Applicant: Panasonic Corporation, Kadoma-shi, Osaka (JP)

(72) Inventors: Masanori Nishikawa, Shiga (JP); Norio Abe, Shiga (JP); Tomoyuki Kawase, Shiga (JP); Naruaki Akai, Kyoto (JP); Takashi Sawa, Shiga (JP); Takaaki Hyoudou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 187 days.

(21) Appl. No.: 14/383,280

(22) PCT Filed: Mar. 8, 2013

(86) PCT No.: PCT/JP2013/001541
§ 371 (c)(1),
(2) Date: Sep. 5, 2014

(87) PCT Pub. No.: WO2013/132874
PCT Pub. Date: Sep. 12, 2013

(65) Prior Publication Data
US 2015/0028809 A1    Jan. 29, 2015

(30) Foreign Application Priority Data

Mar. 8, 2012 (JP) ................................. 2012-051911

(51) Int. Cl.
*H02J 7/14* (2006.01)
*H02J 7/00* (2006.01)
(Continued)

(52) U.S. Cl.
CPC ............ *H02J 7/0029* (2013.01); *B60L 3/0023* (2013.01); *B60L 3/0069* (2013.01); *B60L 3/04* (2013.01);
(Continued)

(58) Field of Classification Search
CPC ..... H02J 7/0029; B60L 3/0023; B60L 3/0069; B60L 3/04; B60L 11/1803; B60L 11/1818; B60L 11/1838; B60L 11/18469; B60L 11/1851; B60L 11/1861
(Continued)

(56) References Cited

U.S. PATENT DOCUMENTS 8,723,477 B2 * 5/2014 Gaul ..................... B60L 3/0069
                                                                320/109
9,156,362 B2 * 10/2015 Soden ...................... B60L 3/04
(Continued)

FOREIGN PATENT DOCUMENTS

CN      201927858 U    8/2011
JP      1-96478 U      6/1989
(Continued)

OTHER PUBLICATIONS

Society of Automotive Engineers, Inc., "SAE Electric Vehicle Conductive Charge Coupler," *SAE International—The Engineering Society for Advancing Mobility Land Sea Air and Space*, SAE J1772, Oct. 1996, Rev. Nov. 2001, vol. 1 (p. 28-30), 4 pages, USA.
(Continued)

*Primary Examiner* — M'Baye Diao
(74) *Attorney, Agent, or Firm* — Brinks Gilson & Lione

(57) ABSTRACT

A temperature detection unit detects the temperature of a power plug. A control unit stops electric conduction to a battery when the detected temperature detected by the temperature detection unit is equal to or higher than a predetermined specified temperature (T1). The control unit
(Continued)

recovers the electric conduction to the battery when the detected temperature detected by the temperature detection unit decreases to a specified temperature (T2) or lower, the specified temperature (T2) being lower than the specified temperature (T1).

14 Claims, 11 Drawing Sheets

(51) Int. Cl.
*H01M 10/44* (2006.01)
*H01M 10/48* (2006.01)
*B60L 11/18* (2006.01)
*B60L 3/00* (2006.01)
*B60L 3/04* (2006.01)

(52) U.S. Cl.
CPC ........ *B60L 11/1803* (2013.01); *B60L 11/1818* (2013.01); *B60L 11/1838* (2013.01); *B60L 11/1846* (2013.01); *B60L 11/1851* (2013.01); *B60L 11/1861* (2013.01); *H01M 10/443* (2013.01); *H01M 10/486* (2013.01); *H02J 7/0031* (2013.01); *B60L 2210/30* (2013.01); *B60L 2230/12* (2013.01); *B60L 2240/36* (2013.01); *B60L 2260/42* (2013.01); *H02J 2007/0039* (2013.01); *Y02T 10/7005* (2013.01); *Y02T 10/705* (2013.01); *Y02T 10/7044* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC .................................................. 320/104, 109
See application file for complete search history.

(56) References Cited

U.S. PATENT DOCUMENTS

| | | | |
|---|---|---|---|
| 9,211,801 B2 * | 12/2015 | Akai | ...................... H01M 10/44 |
| 9,308,825 B2 * | 4/2016 | Hayashigawa | ..... B60L 11/1818 |
| 2008/0094865 A1 | 4/2008 | So et al. | |
| 2009/0167537 A1 | 7/2009 | Feliss et al. | |
| 2010/0228413 A1* | 9/2010 | Fujitake | .................. B60L 11/14 |
| | | | 701/22 |
| 2011/0149455 A1 | 6/2011 | Ueno et al. | |
| 2011/0204849 A1 | 8/2011 | Mukai et al. | |
| 2011/0234159 A1 | 9/2011 | Ohtomo et al. | |
| 2012/0249066 A1 | 10/2012 | Ichikawa | |

FOREIGN PATENT DOCUMENTS

| | | |
|---|---|---|
| JP | 2008-252986 A | 10/2008 |
| JP | 2010-52861 A | 3/2010 |
| JP | 2010-508005 A | 3/2010 |
| JP | 2010-213501 A | 9/2010 |
| WO | WO 2011/064856 A1 | 6/2011 |
| WO | WO 2012/139778 A1 | 10/2012 |

OTHER PUBLICATIONS

Anonymous: "Overshoot (signal) Wikipedia, the Free Encyclopedia", XP055241237, Nov. 5, 2015, 4 pages.
Extended Search Report in corresponding European Application No. 13758710.1, dated Jan. 26, 2016, 10 pages.
International Search Report in corresponding International Application No. PCT/JP2013/001541, dated Apr. 16, 2013, 1 page.

* cited by examiner

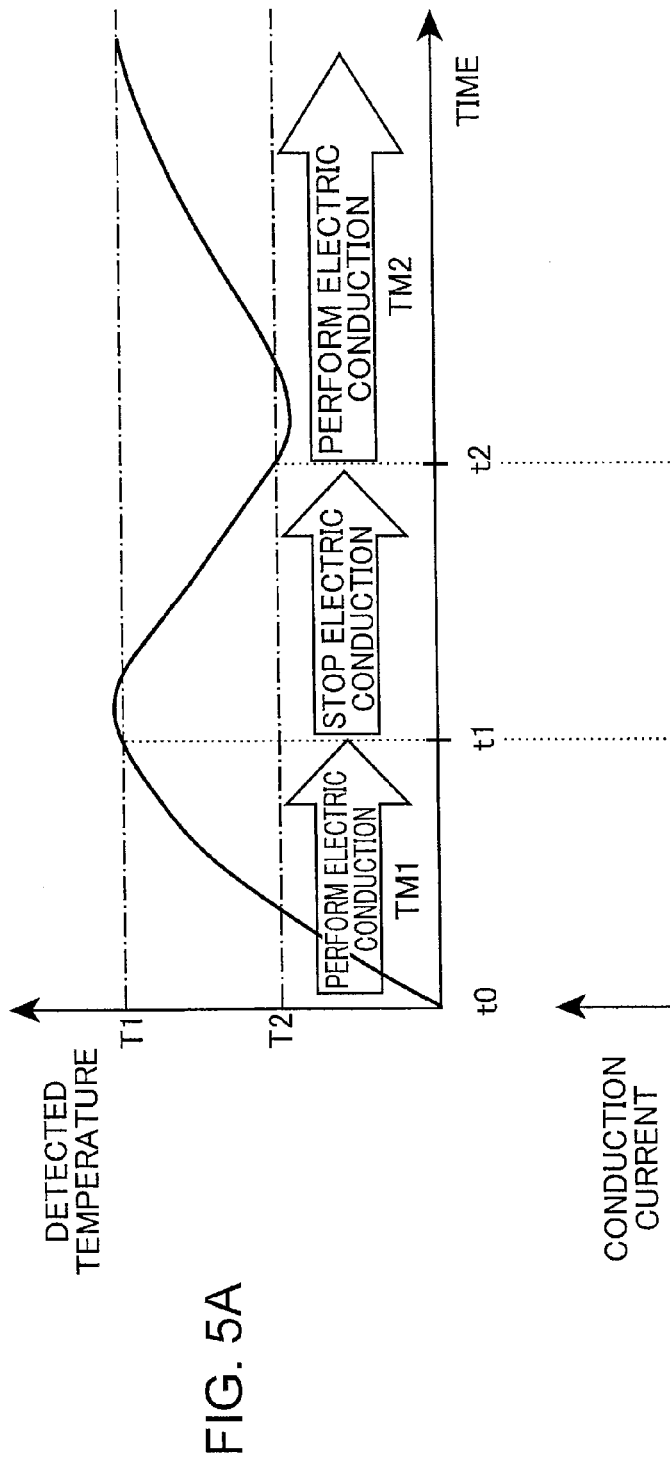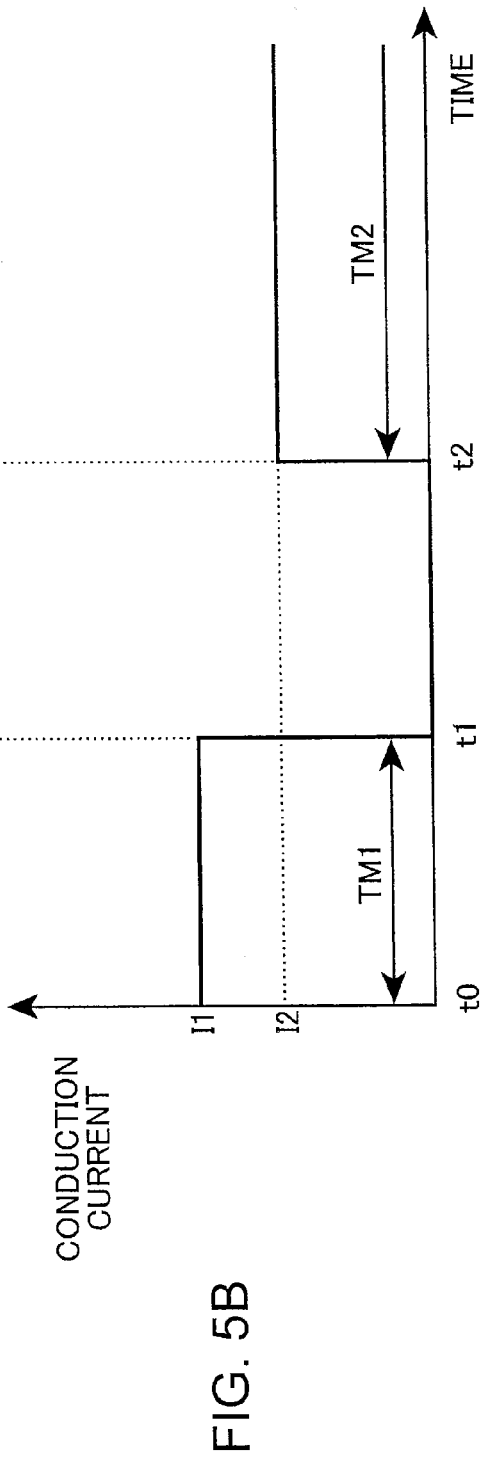

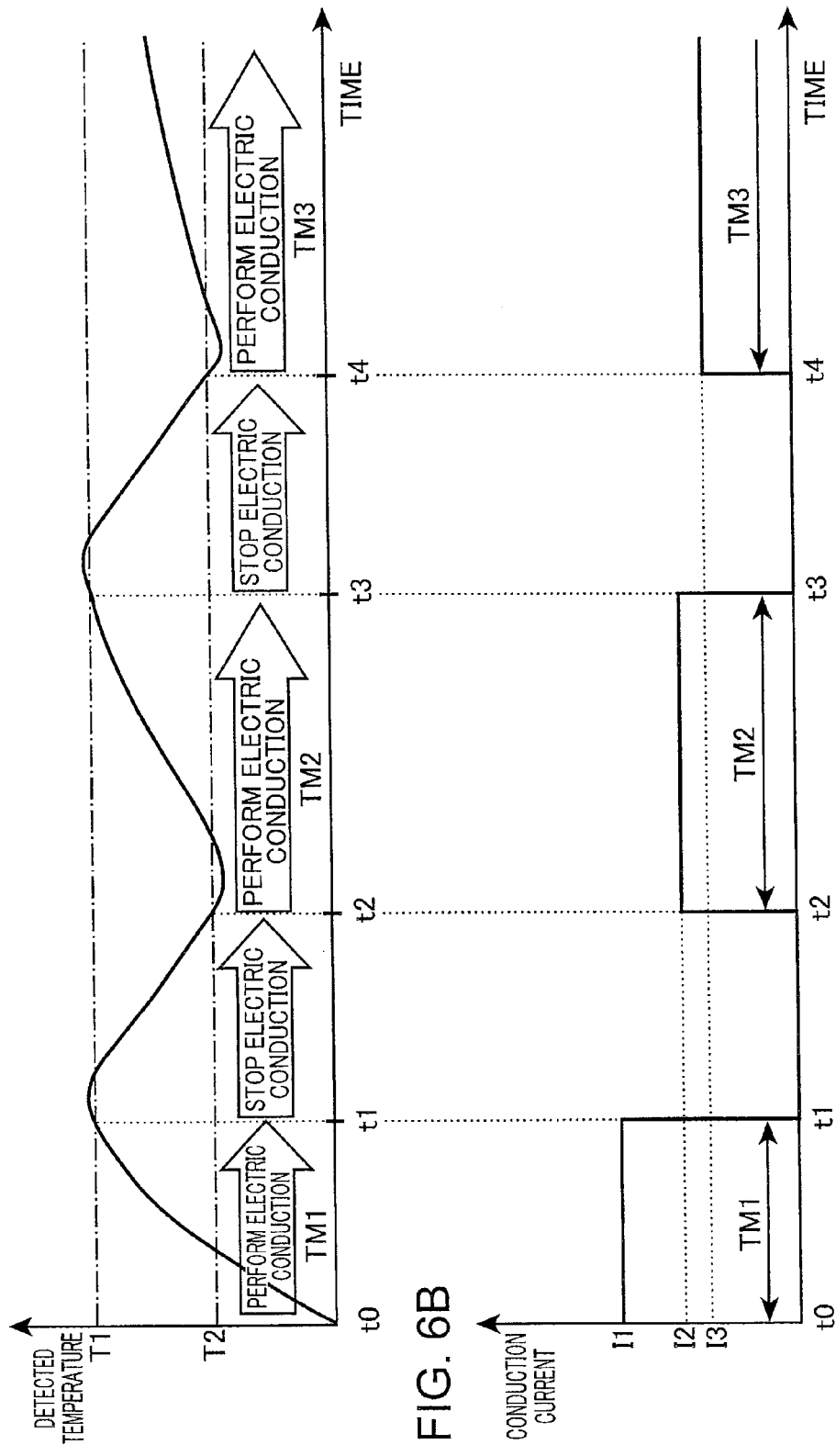

CHARGING CABLE

This application is a 371 application of PCT/JP2013/001541 having an international filing date of Mar. 8, 2013, which claims priority to JP2012-051911 filed Mar. 8, 2012, the entire contents of which are incorporated herein by reference.

TECHNICAL FIELD

The present invention relates to a charging cable for an electric propulsion vehicle such as an electric car or a hybrid car, the charging cable being used to charge a battery for the electric propulsion vehicle.

BACKGROUND ART

In recent years, electric propulsion vehicles known as environment-friendly cars have been developed at a rapid rate. Charging infrastructures for electric propulsion vehicles are roughly classified into two types of charging facilities: home charging facilities utilizing home power supplies that are terminals of a power network; and public charging facilities provided, for example, in urban areas or under road surfaces and based on the assumption that the facilities are used by the general public.

With convenience taken into account, home charging facilities are needed in order to spread electric propulsion vehicles. Thus, slow charging facilities using commercial 100- or 200-V power supplies have started to be introduced into households, offices, and the like.

To charge a battery for an electric propulsion vehicle using a home charging facility, a charging cable for an electric propulsion vehicle is used to connect an electric outlet for a commercial power supply and a connector on the electric propulsion vehicle side together.

The charging cable for the electric propulsion vehicle includes a power plug for connection to the electric outlet for the commercial power supply and a charging plug for connection to the connector on the electric propulsion vehicle side. The charging cable is used in charging the battery by inserting the power plug into the electric outlet disposed on an outer wall of a house or the like.

The charging cable for the electric propulsion vehicle may suffer abnormal heat generation caused by an incomplete connection between the electric outlet and the power plug or a tracking phenomenon. Thus, a charging cable has been proposed which is provided with a temperature sensor that senses the temperature of the power plug (see, for example, Patent Document 1). If the temperature of the power plug exceeds a predetermined value, a control signal is transmitted to a switching circuit that turns on and off an electric circuit between the power plug and the charging plug. This stops power supply from the power plug to the connector on the electric propulsion vehicle side.

However, the charging cable in Patent Document 1 fails to definitely describe the recovery of the temporarily stopped power supply. Thus, according to Patent Document 1, charging may be terminated when the power supply is temporarily stopped. For the home charging facility, desirably, for example, if a user gets home at night and starts charging the battery, the battery will have been fully charged by next morning when the user goes out. Therefore, the home charging facility is faced with a demand to ensure as long a period of charging as possible.

There are various possible factors contributing to abnormal heat generation. Abnormal heat generation may not occur when charging is resumed. Furthermore, abnormal heat generation may be avoided by changing charging conditions. Thus, even when abnormal heat generation occurs, termination of the charging prevents satisfaction of the demand to ensure as long a period of charging as possible.

Patent Document 1: Japanese Patent Application Laid-open No. 2010-110055

SUMMARY OF THE INVENTION

An object of the present invention is to provide a charging cable for an electric propulsion vehicle which allows avoidance of risk from abnormal heat generation and which also enables as long a charging period as possible to be ensured.

A charging cable according to an aspect of the present invention is a charging cable for an electric propulsion vehicle used for charging a battery for the electric propulsion vehicle, the charging cable including a power plug detachably connected to an electric outlet for commercial power supply, a charging plug detachably connected to the electric propulsion vehicle, a temperature detection unit that detects ambient temperature, and a control unit that generates and transmits a pilot signal for adjusting a conduction current to the battery, to the electric propulsion vehicle, wherein the control unit stops electric conduction to the battery when the detected temperature detected by the temperature detection unit is equal to or higher than a predetermined, first specified temperature, and recovers the electric conduction to the battery when the detected temperature decreases to a second specified temperature or lower, the second specified temperature being lower than the first specified temperature.

BRIEF DESCRIPTION OF THE DRAWINGS

FIG. 4 are waveform diagram showing a control sequence for the charging cable according to Embodiment 1 of the present invention, wherein

FIG. 5 are waveform diagram showing a control sequence for a charging cable according to Embodiment 3 of the present invention, wherein FIG. 5A shows the temporal transition of the detected temperature, and FIG. 5B shows the temporal transition of the conduction current.

FIG. 6 are waveform diagram showing a control sequence for a charging cable according to Embodiment 4 of the present invention, wherein FIG. 6A shows the temporal transition of the detected temperature, and FIG. 6B shows the temporal transition of the conduction current.

FIG. 8 are waveform diagram showing a control sequence for a charging cable according to Embodiment 5 of the present invention, wherein FIG. 8A shows the temporal transition of the detected temperature, and FIG. 8B shows the temporal transition of the conduction current.

DESCRIPTION OF EMBODIMENTS

Embodiment 1

Figure 1:
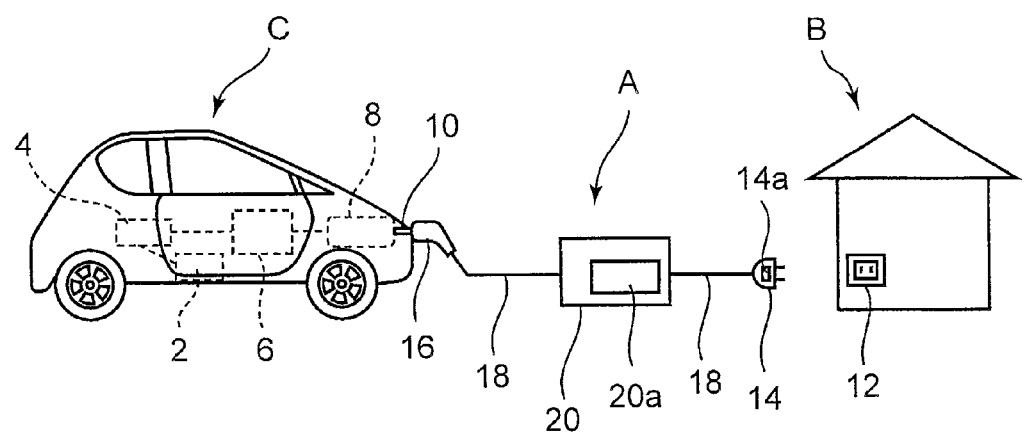
FIG. 1 is a diagram of a general configuration of a charging system to which a charging cable for an electric propulsion vehicle according to Embodiment 1 of the present invention is applied.

Embodiment 1 of the present invention will be described below with reference to the drawings. FIG. 1 is a diagram of a general configuration of a charging system to which a charging cable A for an electric propulsion vehicle according to Embodiment 1 of the present invention is applied. In the charging system, an electric propulsion vehicle C is powered using a commercial power supply at a standard home B via the charging cable A, to charge a battery 6 for the electric propulsion vehicle C.

As shown in FIG. 1, the electric propulsion vehicle C includes a drive motor 2, an inverter 4, the battery 6, and a charging control apparatus 8. The drive motor 2, the inverter 4, the battery 6, and the charging control apparatus 8 are electrically connected together. The electric propulsion vehicle C is connected to the charging cable A via a connector 10 connected to the charging control apparatus 8.

The drive motor 2 is a motor that drives the electric propulsion vehicle C. The inverter 4 converts DC power stored in the battery 6 into AC power and supplies the AC power to the drive motor 2. The battery 6 includes a secondary battery, for example, a nickel hydrogen battery or a lithium ion battery, and is charged using a commercial power supply to store power. The charging control apparatus 8, for example, converts AC power supplied by the commercial power supply into DC power and supplies the DC power to the battery 6. The charging control apparatus 8 includes, for example, a switching regulator. The charging control apparatus 8 is supplied with a pilot signal from a control unit 20a and supplies a conduction current with a current value dependent on the pilot signal to the battery 6.

The charging cable A establishes an electric connection from an electric outlet 12 provided on an outer wall of a house or the like to the electric propulsion vehicle C to charge the battery 6 mounted in the electric propulsion vehicle C.

The electric outlet 12 includes, for example, a waterproof structure that prevents electrodes from being short-circuited due to rain water or the like. The electric outlet 12 is an outlet for the commercial power supply which supplies single-phase, two-wire 100 VAC.

The charging cable A includes a power plug 14, a charging plug 16, and a charging apparatus 20. The power plug 14 is detachably connected to the electric outlet 12. The charging plug 16 is detachably connected to the connector 10 of the electric propulsion vehicle C. The power plug 14 and the charging plug 16 are electrically connected together via a connection cable 18. The charging apparatus 20 is provided in the middle of the connection cable 18 and includes the control unit 20a. The control unit 20a includes, for example, a microcontroller.

Furthermore, the power plug 14 internally includes a temperature detection unit 14a that detects the temperature of the power plug 14. The temperature detection unit 14a includes, for example, a temperature sensor such as a thermistor and is embedded in the power plug 14. A temperature signal indicative of a detected temperature detected by the temperature detection unit 14a is input to the control unit 20a.

The charging apparatus 20 includes a switching circuit and an electric leakage detection unit. The switching circuit includes, for example, a relay to turn on and off an electric circuit between the power plug 14 and the charging plug 16. The electric leakage detection unit monitors a current flowing through the electric circuit to detect electric leakage. If the electric leakage detection unit detects electric leakage, the control unit 20a allows the switching circuit to interrupt the electric circuit. This stops the supply of power from the commercial power supply to the electric propulsion vehicle C.

In the charging system shown in FIG. 1, when the power plug 14 is connected to the electric outlet 12, power from the commercial power supply is supplied to the charging apparatus 20 of the charging cable A. In an initial state, the switching circuit is on. Thus, when the charging plug 16 is connected to the connector 10, the power from the commercial power supply is supplied to the charging plug 16 to charge the battery 6 via the charging control apparatus 8.

Figure 2:
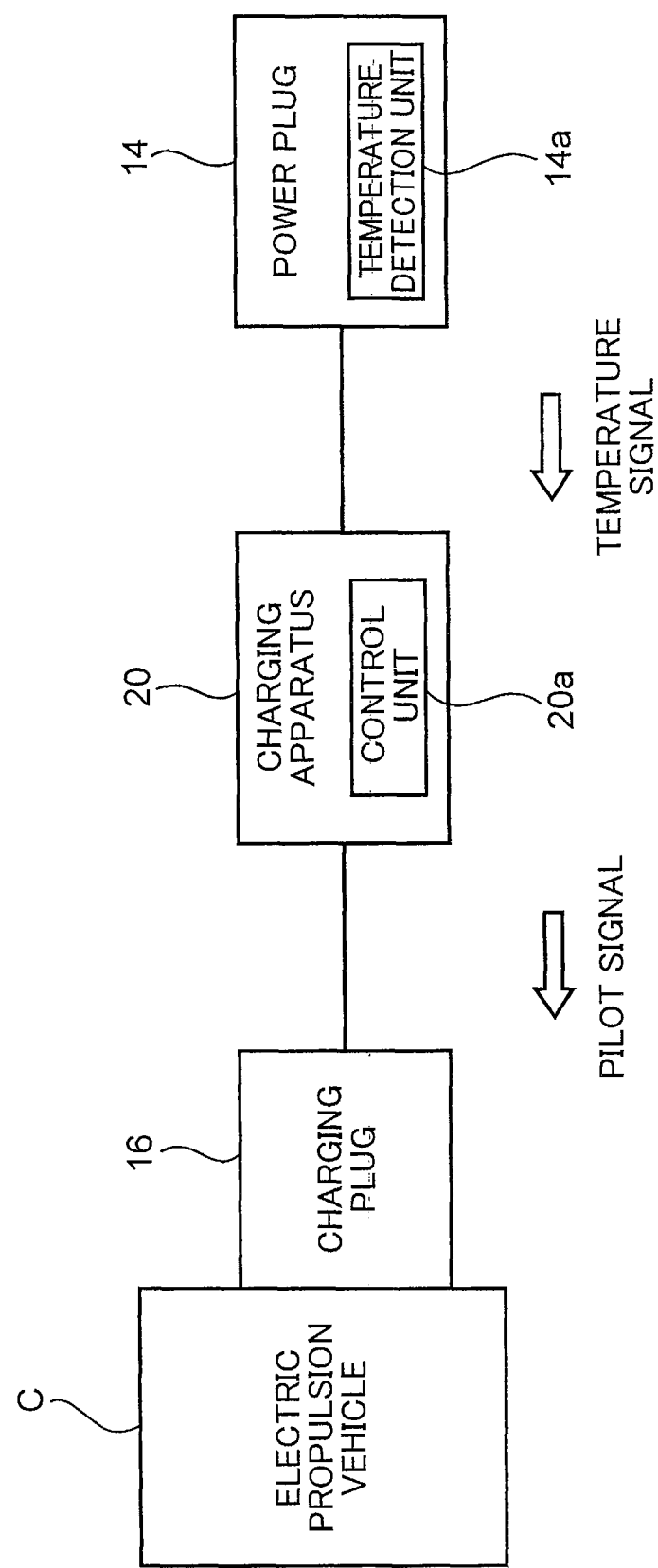
FIG. 2 is a block diagram of the charging cable according to Embodiment 1 of the present invention.

FIG. 2 is a block diagram of the charging cable A according to Embodiment 1 of the present invention. As shown in FIG. 2, the temperature detection unit 14a detects the temperature of the power plug 14 and outputs the temperature signal to the control unit 20a.

When the detected temperature detected by the temperature detection unit 14a is equal to or higher than a predetermined specified temperature T1 (first specified temperature), the control unit 20a stops electric conduction to the battery 6. When the detected temperature decreases to a specified temperature T2 (second specified temperature) or lower, the specified temperature T2 being lower than the specified temperature T1, the control unit 20a recovers the electric conduction to the battery 6.

As the specified temperature T1, a temperature slightly lower than the upper temperature limit of the power plug 14 is adopted. For example, assuming that the upper temperature limit is 65 degrees, a value of about 50 degrees is adopted. Furthermore, as the specified temperature T2, a temperature is adopted at which the power plug 14 is protected from breakage when charging is resumed.

If the power plug 14 is incompletely connected to the electric outlet 12, abnormal heat generation may occur in the power plug 14. Furthermore, when the power plug 14 and the electric outlet 12 remain connected together for a long time, dust may be collected between the power plug 14 and the electric outlet 12 to cause a tracking phenomenon, leading to abnormal heat generation in the charging plug 16. To avoid this, Embodiment 1 stops the electric conduction when the detected temperature exceeds the specified temperature T1.

The control unit 20a transmits a pilot signal for setting a conduction current to the battery 6, to the charging control apparatus 8, to allow the charging control apparatus 8 to supply a conduction current with a value dependent on the pilot signal to the battery 6. Power charged to the battery 6 is supplied to the drive motor 2 via the inverter 4 to enable the electric propulsion vehicle C to be driven.

As the pilot signal, for example, a pulse wave may be adopted. The charging control apparatus 8 determines the conduction current in accordance with the duty ratio of the pulse wave.

Embodiment 1 uses a pilot signal conforming with the SAE J1772 (SAE: Society of Automotive Engineers) standard. According to the standard, the pilot signal and the duty ratio are, for example, in the following relation.

Duty ratio D=20%:12A

Duty ratio D=30%:18A

Thus, the control unit 20a determines the current value of the conduction current by adjusting the duty ratio of the pilot signal. However, this is illustrative and any other technique may be used. For example, the control unit 20a may change the current value of a charging current by changing the amplitude of the pulse of the pilot signal.

Figure 4A:
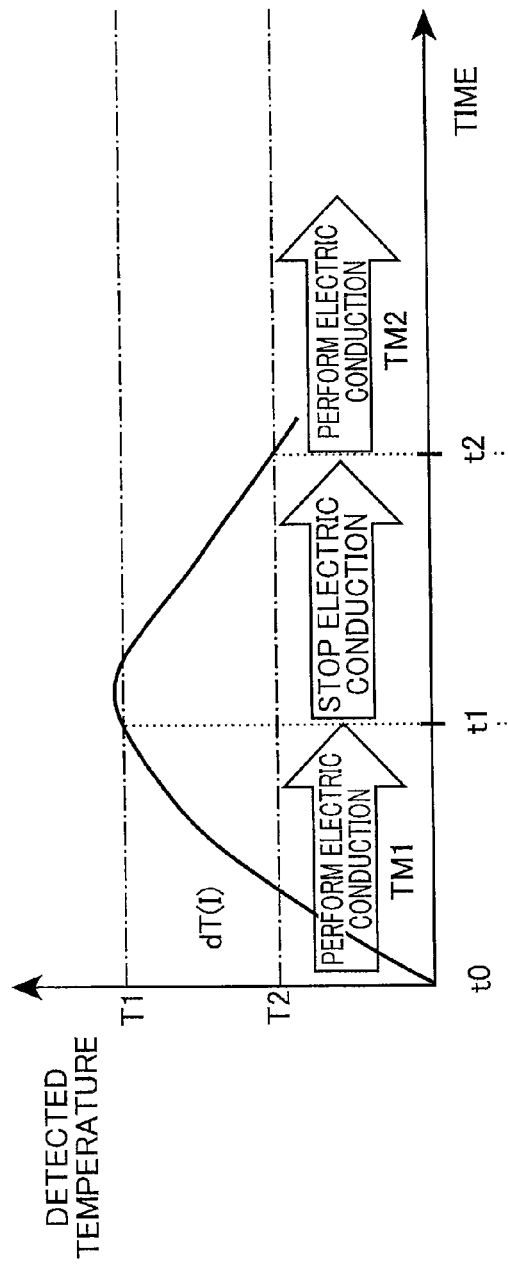
FIG. 4A shows a temporal transition of a detected temperature.
Figure 4B:
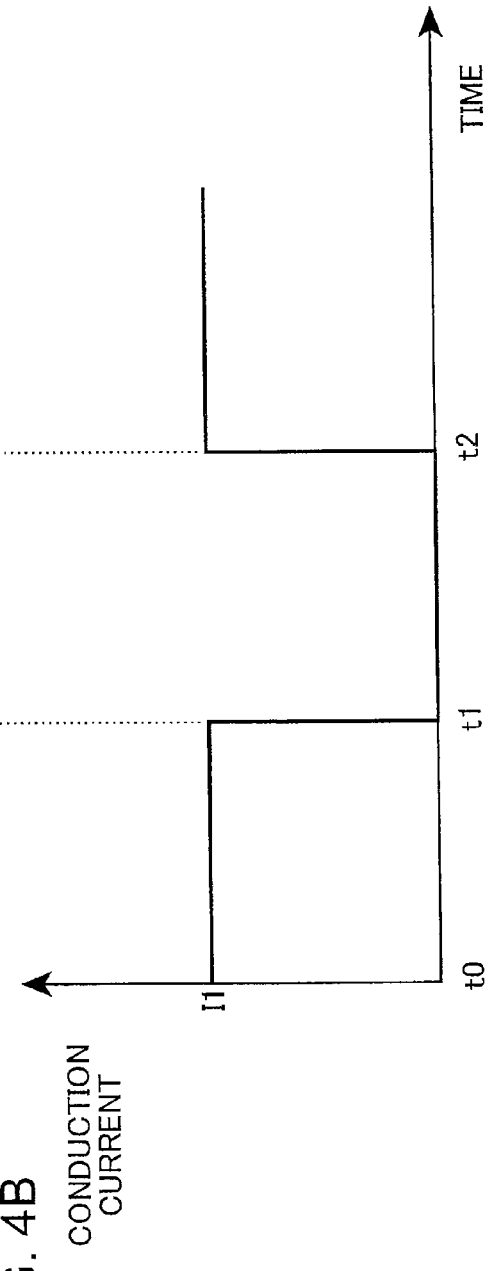
FIG. 4B shows a temporal transition of a conduction current.

FIG. 4 are waveform diagram showing a control sequence for the charging cable A according to Embodiment 1 of the present invention. FIG. 4A shows the temporal transition of the detected temperature, and FIG. 4B shows the temporal transition of the conduction current. In FIG. 4A, the axis of ordinate indicates the detected temperature, and the axis of abscissas indicates time. In FIG. 4B, the axis of ordinate indicates the conduction current, and the axis of abscissas indicates time.

First, at time t0, the control unit 20a transmits a pilot signal allowing the conduction current to be set to a current value I1, to the charging control apparatus 8. Thus, a conduction current of the current value I1 is supplied to the battery 6 to start electric conduction. When the electric conduction is started, the detected temperature correspondingly gradually increases. At time t1, the detected temperature is equal to or higher than the specified temperature T1, and thus, the control unit 20a turns off the switching circuit to stop the electric conduction. Consequently, the conduction current is zeroed, and the detected temperature gradually decreases.

At time t2, the detected temperature is equal to or lower than the specified temperature T2, and thus, the control unit 20a transmits a pilot signal with a duty ratio allowing the conduction current to be set to the current value I1, to the charging control apparatus 8, in order to recover the electric conduction to the battery 6. Consequently, the electric conduction is recovered to supply a conduction current of the current value I1 to the battery 6 again.

Figure 3:
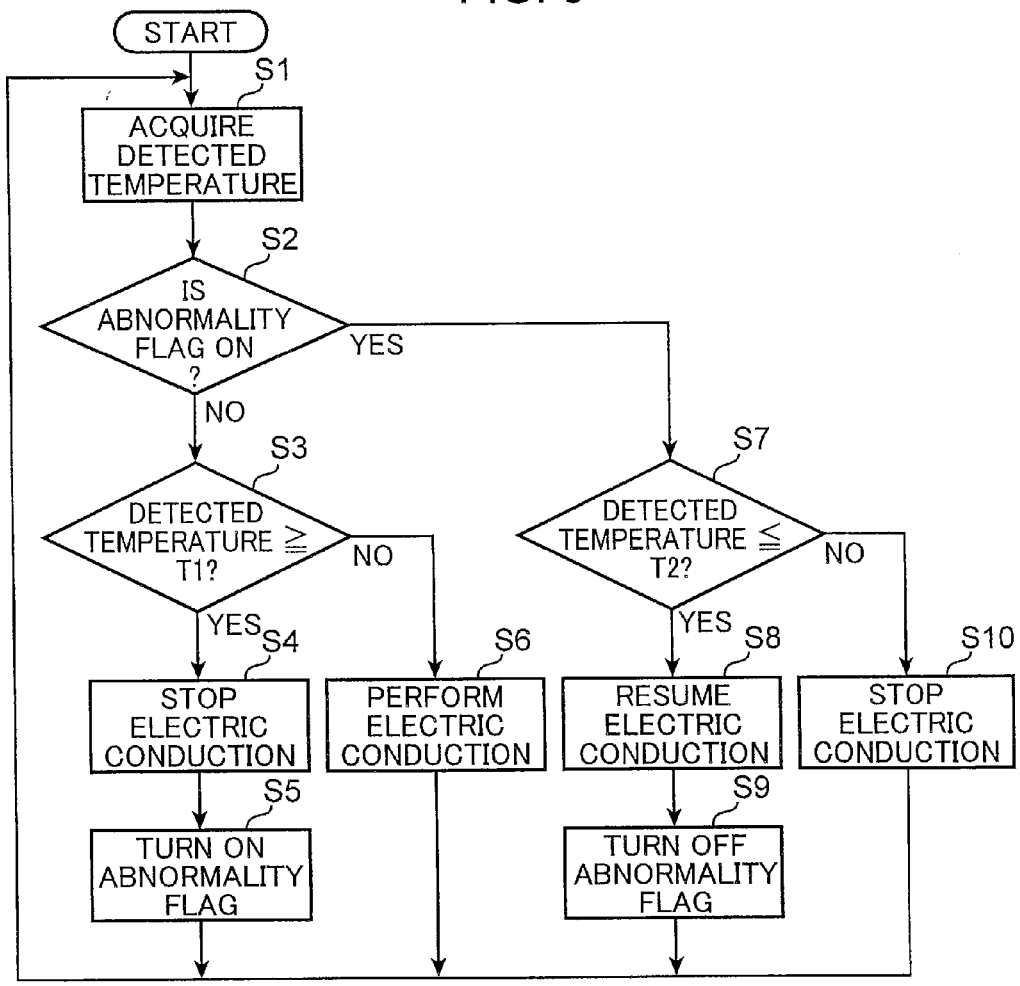
FIG. 3 is a flowchart showing operation of the charging cable according to Embodiment 1 of the present invention.

FIG. 3 is a flowchart showing operation of the charging cable A according to Embodiment 1 of the present invention. First, the control unit 20a receives a temperature signal from the temperature detection unit 14a to acquire the detected temperature of the power plug 14 (S1). The temperature detection unit 14a transmits the temperature signal at a predetermined detection period, and thus, the control unit 20a acquires the detected temperature of the power plug 14 at the predetermined detection period.

Then, the control unit 20a determines whether or not an abnormality flag is on (S2). In this case, when the detected temperature is equal to or higher than the specified temperature T1 and the control unit 20a stops the electric conduction, the control unit 20a then turns the abnormality flag on. During the electric conduction, the abnormality flag is off.

When the abnormality flag is off (N in S2), that is, a current is flowing, the control unit 20a determines whether or not the detected temperature is equal to or higher than the specified temperature T1 (S3). Then, when the detected temperature is equal to or higher than the specified temperature T1 (Y in S3), the control unit 20a sets the switching circuit to an OFF state to stop the electric conduction (S4). Then, the control unit 20a turns the abnormality flag on (S5) to return the process to S1.

On the other hand, when the detected temperature is lower than the specified temperature T1 (N in S3), the control unit 20a allows the electric conduction to the battery 6 to continue (S6) and returns the process to S1.

Furthermore, when the abnormality flag is on (Y in S2), the control unit 20a determines whether or not the detected temperature is equal to or lower than the specified temperature T2 (S7). When the detected temperature is equal to or lower than the specified temperature T2 (Y in S7), the control unit 20a sets the switching circuit to an ON state to resume the electric conduction to the battery 6 (S8). Then, the control unit 20a turns the abnormality flag off (S9) to return the process to S1. On the other hand, when the detected temperature is higher than the specified temperature T2 (N in S7), the control unit 20a maintains the electric conduction (S10).

When the detected temperature is equal to or higher than the specified temperature T1 and the control unit 20a stops the electric conduction, the detected temperature gradually decreases. Then, the electric conduction can be resumed without any problem if the detected temperature has decreased to a value at which the power plug 14 is prevented from being damaged when the electric conduction is resumed.

Thus, for the charging cable A, the temperature of the power plug 14 is monitored, and the electric conduction is stopped when the temperature is equal to or higher than the specified temperature T1. The temperature of the power plug 14 is subsequently monitored, and the electric conduction is resumed when the temperature of the power plug 14 is equal to or lower than the specified temperature T2. Such a process is repeated while the charging cable A remains connected to the electric propulsion vehicle C. Thus, when the detected temperature exceeds a certain value, the use of the charging cable A allows a long period of electric conduction to be ensured compared to adoption of a conventional configuration that terminates charging in such a case.

This enables an increase in the possibility that, for example, if a user gets home at night and then connects the charging cable A to the electric propulsion vehicle C to start charging, the battery 6 will have been fully charged next morning when the user goes out. This satisfies a demand to allow the home charging facility to ensure as long a period of electric conduction as possible.

Furthermore, there are various reasons why the detected temperature becomes equal to or higher than the specified temperature T1. For example, the detected temperature may become equal to or higher than the specified temperature T1 because the atmospheric temperature happens to be high at a certain period during a period of charging. In this case, even with the resumption of the electric conduction, if the atmospheric temperature has lowered, the number of times that the detected temperature becomes equal to or higher than the specified temperature T1 decreases or is even zeroed. In such a case, the charging cable A is useful.

In Embodiment 1, the commercial power supply is 100 VAC. However, any other AC voltage (for example, 200 VAC) may be used. This also applies to the embodiments described below.

Embodiment 2

The charging cable A according to Embodiment 2 is characterized by avoiding the recovery of the electric conduction to the battery 6 even when the detected temperature decreases to the specified temperature T2 or lower if the detected temperature during the period of electric conduction has a temperature gradient equal to or larger than a predetermined specified temperature gradient. Components of Embodiment 2 which are the same as the corresponding components of Embodiment 1 are denoted by the same reference numerals and will not be described.

Control according to Embodiment 2 will be described using FIG. 4. In Embodiment 2, the control unit 20a calculates the temperature gradient during a period of electric conduction TM1. Each time the temperature detection unit 14a transmits a detected temperature to the control unit 20a during the period of electric conduction TM1, the control unit 20a determines the difference between the currently transmitted detected temperature and the lastly transmitted detected temperature. The control unit 20a then divides the difference by the detection period of the detected temperature to determine a differential value for the detected temperature and stores the difference in a memory (not shown in the drawings). When the period of electric conduction TM1 ends, the control unit 20a temporarily ends the process of calculating the differential value for the detected temperature.

When the time to start the next period of electric conduction TM2 comes (time t1) when the detected temperature becomes equal to or lower than the specified temperature T2, the control unit 20a determines a representative value (for example, a median value or a mean value) for the differential values for the detected temperatures during the period of electric conduction TM1 stored in the memory. The control unit 20a determines the representative value as a temperature gradient dT(1) for the period of electric conduction TM1. When the temperature gradient dT(1) is equal to or larger than a predetermined specified temperature gradient, the control unit 20a keeps the switching circuit in the OFF state to avoid the recovery of the electric conduction to the battery 6.

As the specified temperature gradient, for example, a value may be adopted at which the detected temperature has a steep temperature gradient, leading to the expectation that abnormality is evidently occurring in a power plug 14. In this case, the abnormality in the power plug 14 may be layer short-circuiting caused by damage to a component such as a prong.

This avoids the recovery of the electric conduction and thereby prevents damage to the power plug 14, even when the detected temperature is equal to or lower than the specified temperature T2. Embodiment 2 may be applied to any of the embodiments described below.

Embodiment 3

The charging cable A according to Embodiment 3 is characterized by reducing the conduction current compared to a value used before the stop of the electric conduction to the battery 6 when the electric conduction is to be recovered. Components of Embodiment 3 which are the same as the corresponding components of Embodiments 1 and 2 are denoted by the same reference numerals and will not be described.

FIG. 5 are waveform diagram showing a control sequence for the charging cable A according to Embodiment 3 of the present invention. FIG. 5A shows the temporal transition of the detected temperature, and FIG. 5B shows the temporal transition of the conduction current. In FIG. 5A, the axis of ordinate indicates the detected temperature, and the axis of abscissas indicates time. In FIG. 5B, the axis of ordinate indicates the conduction current, and the axis of abscissas indicates time.

FIG. 5A and FIG. 5B are the same as FIG. 4A and FIG. 4B in that the electric conduction is stopped when the detected temperature is equal to or higher than the specified temperature T1 and resumed when the detected temperature is equal to or lower than the specified temperature T2. According to Embodiment 3, when the time to start the period of electric conduction TM2 comes (time t2) when the detected temperature is equal to or lower than the specified temperature T2, the control unit 20a transmits a pilot signal allowing the conduction current to be set to a current value I2(<I1), to the charging control apparatus 8, to charge the battery 6 with a conduction current of the current value I2. As the current value I2, a current value may be adopted which is smaller than the current value I1 by a preset value.

As described above, when the current value of the conduction current is reduced when the electric conduction is recovered, a rise in the temperature of the power plug 14 can be suppressed to ensure as long a period of electric conduction as possible.

In Embodiment 3, when the detected temperature becomes equal to or higher than the specified temperature T1 again during the period of electric conduction TM2, charging of the battery 6 may be ended to ensure safety. This is based on the idea that the detected temperature remaining higher than the specified temperature T2 in spite of a decrease in current value indicates serious damage to the power plug 14.

It is assumed that, after the electric conduction is ended because the detected temperature becomes equal to or higher than the specified temperature T1 again during the period of electric conduction TM2, the detected temperature becomes equal to or lower than the specified temperature T2 and the electric conduction is to be recovered. Then, according to Embodiment 3, the current value may be set, for electric conduction, equal to the current value I2 used during the period of electric conduction TM2. In this case, a conduction current of the current value I2 may be used for the subsequent periods of electric conduction TM4, TM5, . . . , and TMn. This allows charging to be continued as long as possible in spite of the possibility that the detected temperature reaches the specified temperature T1.

Embodiment 4

The charging cable A according to Embodiment 4 is characterized by reducing the conduction current each time the electric conduction to the battery 6 is recovered. Components of Embodiment 4 which are the same as the corresponding components of Embodiments 1 to 3 are denoted by the same reference numerals and will not be described.

FIG. 6 are waveform diagram showing a control sequence for the charging cable A according to Embodiment 4 of the present invention. FIG. 6A shows the temporal transition of the detected temperature, and FIG. 6B shows the temporal transition of the conduction current. In FIG. 6A, the axis of ordinate indicates the detected temperature, and the axis of abscissas indicates time. In FIG. 6B, the axis of ordinate indicates the conduction current, and the axis of abscissas indicates time.

As shown in FIG. 6B, according to Embodiment 4, the conduction current is gradually reduced to the current value I1, to the current value I2, to a current value I3, . . . , and to a current value In when electric conduction is performed during the period of electric conduction TM1, during the period of electric conduction TM2, during a period of electric conduction TM3, . . . , and during a period of electric conduction TMn, respectively.

Preferably, as the last period of electric conduction increases, the control unit 20a sets, to a smaller value, the amount by which the conduction current is reduced compared to a value used during the last period of electric conduction. This allows prevention of a situation in which the conduction current is unnecessarily reduced, thus increasing the amount of time needed to fully charge the battery 6. That is, when the last period of electric conduction is long, this indicates that the detected temperature has a small temperature gradient. If, during the next period of electric conduction, the conduction current is reduced by a default amount, the temperature gradient of the detected temperature is further decreased, precluding the battery 6 from being fully charged quickly. Thus, according to Embodiment 4, the amount by which the conduction current is reduced is decreased as the last period of electric conduction increases.

The last period of electric conduction is hereinafter denoted by TM2, and the period of electric conduction following the period of electric conduction TM2 is hereinafter denoted by TM3. A process for calculating the conduction current during the period of electric conduction TM3 will be described. First, the control unit 20a detects the length of the period of electric conduction TM2. The control unit 20a may detect the length of the period of electric conduction TM2 by starting a count operation when the period of electric conduction TM2 is started and stopping the count operation when the period of electric conduction TM2 ends. The control unit 20a may then store the detected length in the memory.

Then, when the time to start the period of electric conduction TM3 (time t4) comes when the detected temperature is equal to or lower than the specified temperature T2, the control unit 20a compares the period of electric conduction TM2 with a reference period of electric conduction TM_ref serving as a preset reference. When TM2≥TM_ref, the control unit 20a corrects and decreases the default amount of reduction ΔI_ref by which the conduction current is reduced to calculate the actual amount of reduction ΔI. On the other hand, When TM2<TM_ref, the control unit 20a corrects and increases the default amount of reduction ΔI_ref by which the conduction current is reduced to calculate the actual amount of reduction ΔI. As the reference period of electric conduction TM_ref, for example, a standard period of electric conduction may be adopted which is needed for the detected temperature to exceed the specified temperature T1.

The control unit 20a may calculate the actual amount of reduction ΔI, for example, based on ΔI=ΔI_ref×(TM_ref/TM2). This allows the actual amount of reduction ΔI to be set to a value decreasing with increasing TM2 compared to TM_ref and increasing with decreasing TM2 compared to TM_ref. The control unit 20a then uses I3=I2−ΔI to calculate the current value I3 for the period of electric conduction TM3.

In the above description, only the last period of electric conduction is adopted. However, the amount of reduction ΔI may be calculated using a plurality of past periods of electric conduction. The default amount of reduction Δ_ref may be corrected to calculate the actual amount of reduction ΔI by, for example, determining a mean value for TM1 and TM2 and comparing the mean value with the reference period of electric conduction TM_ref.

Figure 7:
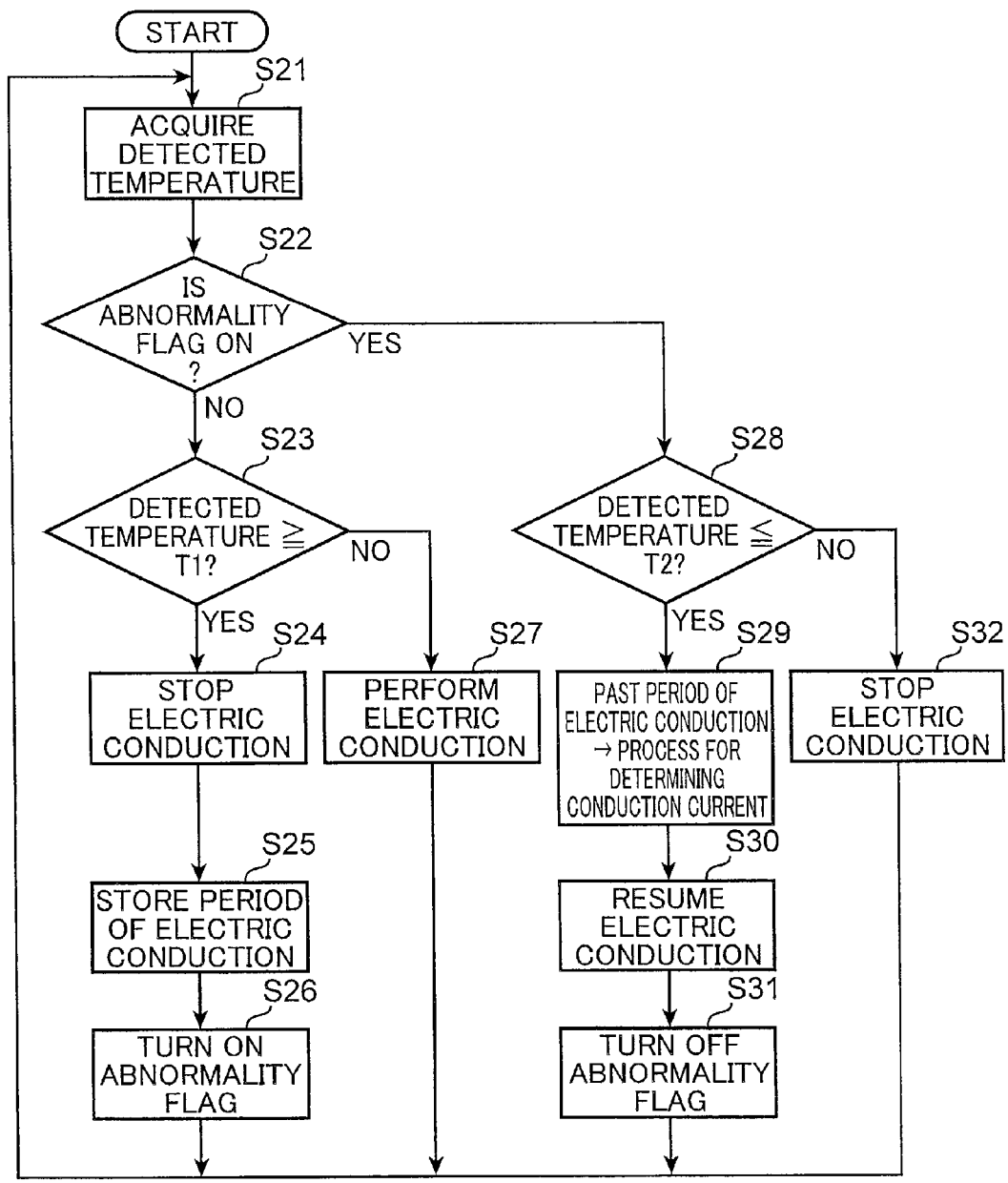
FIG. 7 is a flowchart showing operation of the charging cable according to Embodiment 4 of the present invention.

FIG. 7 is a flowchart showing operation of the charging cable A according to Embodiment 4 of the present invention. The flowchart shown in FIG. 7 is different from the flowchart shown in FIG. 3 in that the flowchart in FIG. 7 has additional steps S25 and S29. The remaining part of the process including S21 to S24, S26 to S28, and S30 to S32 is the same as S1 to S10 in FIG. 3 and will thus not be described.

In S25, the control unit 20a detects the length of the period of electric conduction and stores the length in the memory. In S29, the detected temperature becomes equal to or lower than the specified temperature T2, and thus, a process of determining the conduction current based on the past periods of electric conduction is executed (S29). The electric conduction is thus resumed (S30). The process of determining the conduction current has been described above.

In the above description, the example has been illustrated in which the amount of reduction in current value is changed in accordance with the length of the past period of electric conduction. The present invention is not limited to this. The amount of reduction in conduction current may be a constant value irrespective of the past periods of electric conduction. In this case, the control unit 20a may reduce the default amount of reduction ΔI_ref in stages each time a period of electric conduction starts.

Furthermore, the control unit 20a may set the amount of reduction ΔI so that the amount of reduction ΔI gradually decreases in accordance with a preset pattern, to reduce the conduction current in stages. In these cases, the control can be simplified.

Embodiment 5

The charging cable A according to Embodiment 5 is characterized by reducing the conduction current compared to a value used before the stop of the electric conduction to the battery 6 and then increasing the resultant conduction current until the detected temperature becomes equal to or higher than the specified temperature T1, when the electric conduction to the battery 6 is to be recovered.

Figure 8:
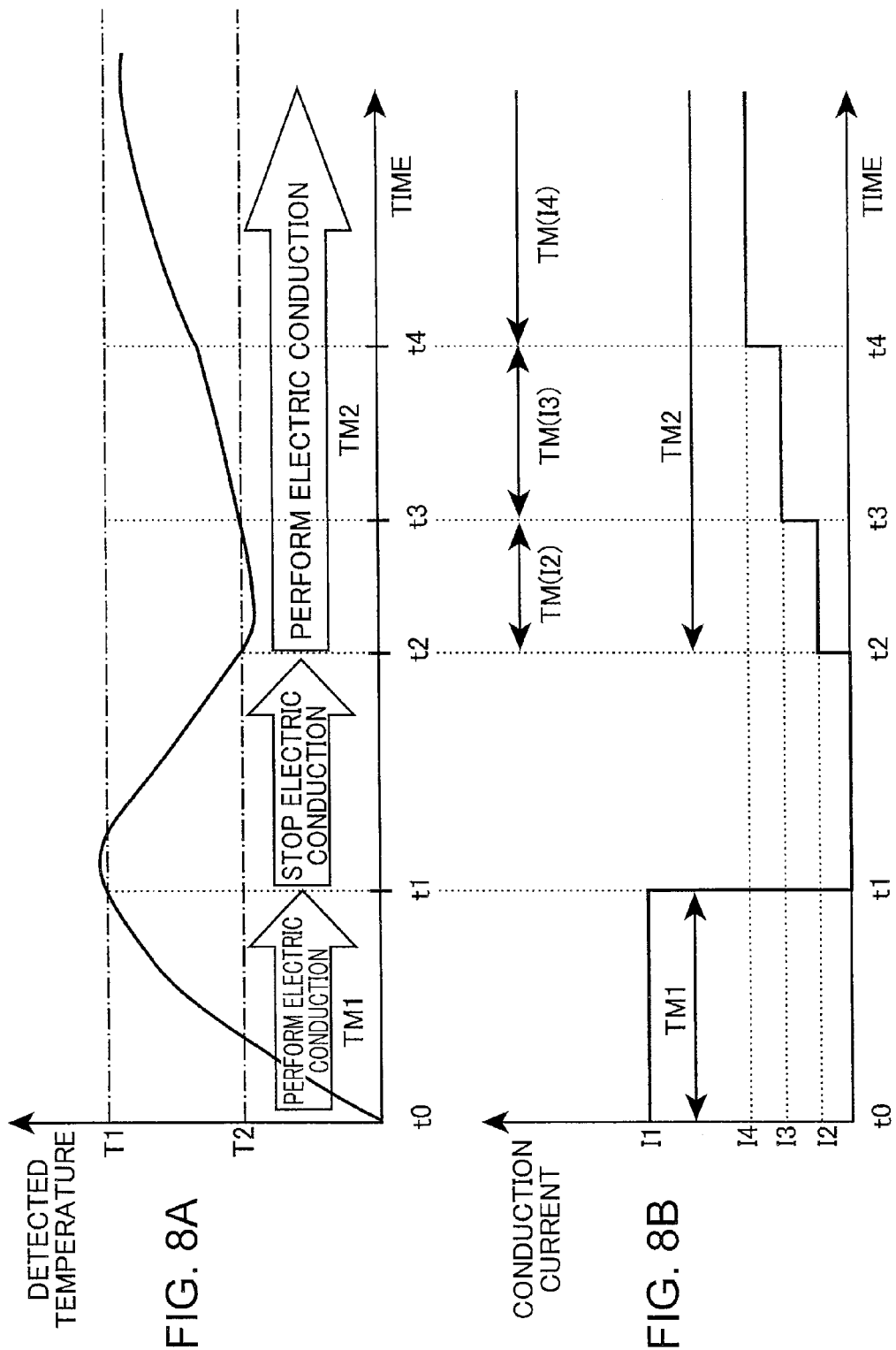

FIG. 8 are waveform diagram showing a control sequence for the charging cable A according to Embodiment 5 of the present invention. FIG. 8A shows the temporal transition of the detected temperature, and FIG. 8B shows the temporal transition of the conduction current. In FIG. 8A, the axis of ordinate indicates the detected temperature, and the axis of abscissas indicates time. In FIG. 8B, the axis of ordinate indicates the conduction current, and the axis of abscissas indicates time.

As shown in FIG. 8B, the control sequence for the charging cable A according to Embodiment 5 is the same as the control sequences according to Embodiments 1 to 4 in a part of the sequence from the stop of the electric conduction when the detected temperature becomes equal to or higher than the specified temperature T1 to the recovery of the electric conduction when the detected temperature becomes equal to or lower than the specified temperature T2. According to Embodiment 5, when the electric conduction is to be recovered, the current value I2 is drastically reduced compared to the current value I1. Subsequently, the resultant current value of the conduction current is gradually increased to I3 and to I4 with the detected temperature monitored.

After recovering the electric conduction at time t2, the control unit 20a monitors the detected temperature during a period of determination TM(I2). At time t3 when the period of determination TM(I2) ends, if a value by which the detected temperature has risen during the period of determination TM(I2) is equal to or smaller than a reference increase value ΔT_ref(I2), the control unit 20a increases the current value from I2 to I3. As the period of determination TM(I2), a period preset in accordance with the current value I2 is adopted. Furthermore, values dependent on the current values I3, I4, . . . are adopted for a period of determination TM(I3), a period of determination TM(I3), . . . . The adopted reference increase value ΔT_ref(I2) is a standard increase value for an increase in the detected temperature observed when the current value I2 is used for the electric conduction or an increase value slightly higher than the standard increase value. The adopted reference increase values ΔT_ref(I3), ΔT_ref(I4), . . . are also each a standard increase value for an increase in detected temperature or an increase value slightly higher than the standard increase value in accordance with the current values I3, I4, . . . .

In an example shown in FIG. 8B, at time t3, the increase value for an increase in detected temperature during the period of determination TM(I2) is equal to or smaller than the reference increase value ΔT_ref(I2). Thus, the current value is increased from I2 to I3.

On the other hand, at time t3, if the increase value for an increase in detected temperature is larger than the reference increase value ΔT_ref(I2), the control unit 20a keeps the current value at I2 instead of increasing the current value.

Subsequently, after increasing the current value from I2 to I3, the control unit 20a monitors the detected temperature during the period of determination TM(I3). At time t4 when the period of determination TM(I3) ends, if the increase value for an increase in detected temperature during the period of determination TM(I3) is equal to or smaller than the reference increase value ΔT_ref(I3), the control unit 20a increases the current value from I3 to I4. On the other hand, at time t3, if the increase value for an increase in detected temperature is larger than the reference increase value ΔT_ref(I3), the control unit 20a keeps the current value at I3 instead of increasing the current value.

In the example shown in FIG. 8B, at time t4, the increase value for an increase in detected temperature is equal to or smaller than the reference increase value ΔT_ref(I3), and thus, the current value is increased from I3 to I4. Subsequently, the detected temperature is similarly monitored, and if the increase value for an increase in detected temperature during a period of determination TM(I(i)) does not exceed a reference increase value ΔT_ref(I(i)) when the period of determination TM(I(i)) ends, the current value is increased from I(i) to I(i+1).

In the example shown in FIG. 8B, the period of determination gradually increases from TM(I2) through TM(I3) to TM(I4). However, this is only illustrative, and the period of determination may be gradually reduced or may be constant.

Furthermore, according to Embodiment 5, when the detected temperature becomes equal to or higher than the specified temperature T1 after the electric conduction is recovered, the electric conduction is stopped at the same point where the electric conduction is stopped according to Embodiments 1 to 4. When the detected temperature T1 becomes equal to or higher than the specified temperature T1 again, the following control sequence adopted is executed: the current value is drastically reduced compared to the value used during the last period of electric conduction shown in FIG. 8B, and then, the conduction current is gradually increased with the detected temperature monitored.

In the above description, the increase value for an increase in detected temperature is compared with the reference increase value ΔT_ref to determine whether or not to increase the current value. However, the present invention is not limited to this, but for example, the temperature gradient of the detected temperature may be compared with the reference temperature gradient to determine whether or not to increase the current value.

The description below takes the period of determination TM(I2) as an example. Each time the detected temperature is acquired during the period of determination TM(I2), the control unit 20a calculates a differential value for the detected temperature by dividing the difference between the currently acquired detected temperature and the lastly acquired detected temperature by the detection period, and stores the differential value in the memory. When time t3 comes when the period of determination TM(I2) ends, the control unit 20a calculates a representative value (for example, a median value or a mean value) for the differential values for the detected temperatures during the period of determination TM(I2) stored in the memory, as a temperature gradient dT(I2) for the period of determination TM(I2). The control unit 20a may increase the current value from I2 to I3 when the temperature gradient dT(I2) is equal to or smaller than a reference temperature gradient dT_ref(I2) preset for the current value I2. The reference temperature gradient dT_ref(I2) adopted may be a standard temperature gradient obtained when the current value I2 is used for the electric conduction or a temperature gradient slightly larger than the standard temperature gradient.

Embodiment 6

Figure 9:
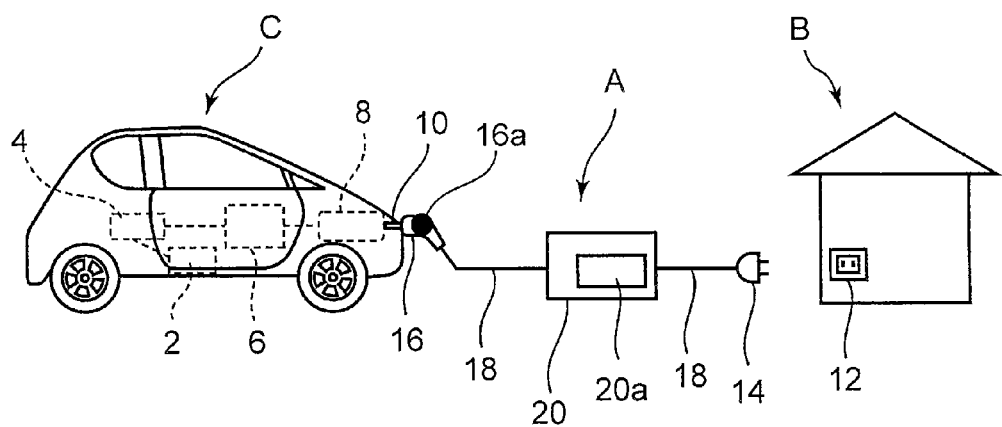
FIG. 9 is a diagram of a general configuration of a charging system to which a charging cable according to Embodiment 6 of the present invention is applied.
Figure 10:
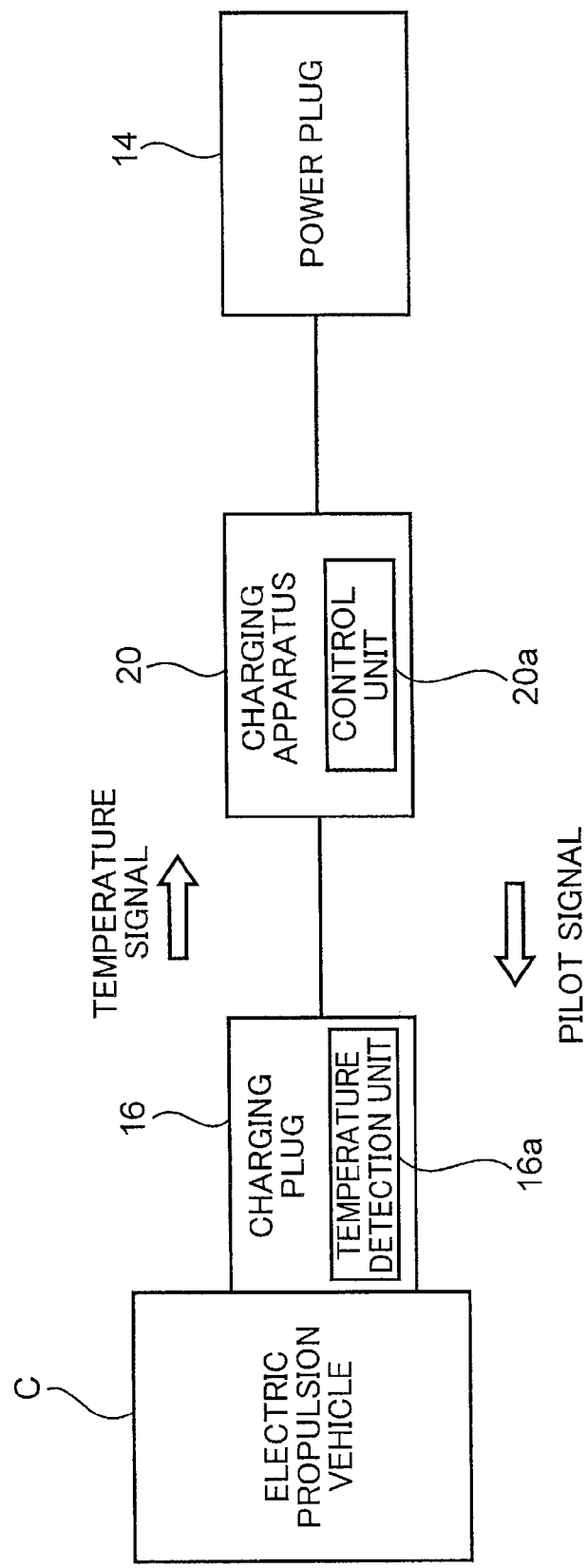
FIG. 10 is a block diagram of the charging cable according to Embodiment 6 of the present invention.

The charging cable A according to Embodiment 6 is characterized by a temperature detection unit provided in the charging plug 16 rather than in the power plug 14. FIG. 9 is a diagram of a general configuration of a charging system to which the charging cable A according to Embodiment 6 of the present invention is applied. FIG. 10 is a block diagram of the charging cable A according to Embodiment 6 of the present invention.

As shown in FIG. 9 and FIG. 10, a temperature detection unit 16a is located in the charging plug 16. If the charging plug 16 is incompletely connected to the connector 10 of the electric propulsion vehicle C, abnormal heat generation may occur in the charging plug 16. Furthermore, when the charging plug 16 and the connector 10 remain connected together for a long time, dust may be collected between the charging plug 16 and the connector 10 to cause a tracking phenomenon, leading to abnormal heat generation in the charging plug 16.

Thus, according to Embodiment 6, the temperature detection unit 16a is located in the charging plug 16. Thus, possible abnormal heat generation in the charging plug 16 can be accurately detected. Then, even if the temperature of the charging plug 16 becomes equal to or lower than the specified temperature T1 to cause the electric conduction to be stopped, the electric conduction is recovered as is the case with Embodiments 1 to 5 when the temperature of the charging plug 16 decreases to the specified temperature T2 or lower. Consequently, even if a slight level of abnormal heat generation occurs in the charging plug 16, a sufficient conduction time can be provided to allow the battery to be fully charged.

Embodiment 7

Figure 11:
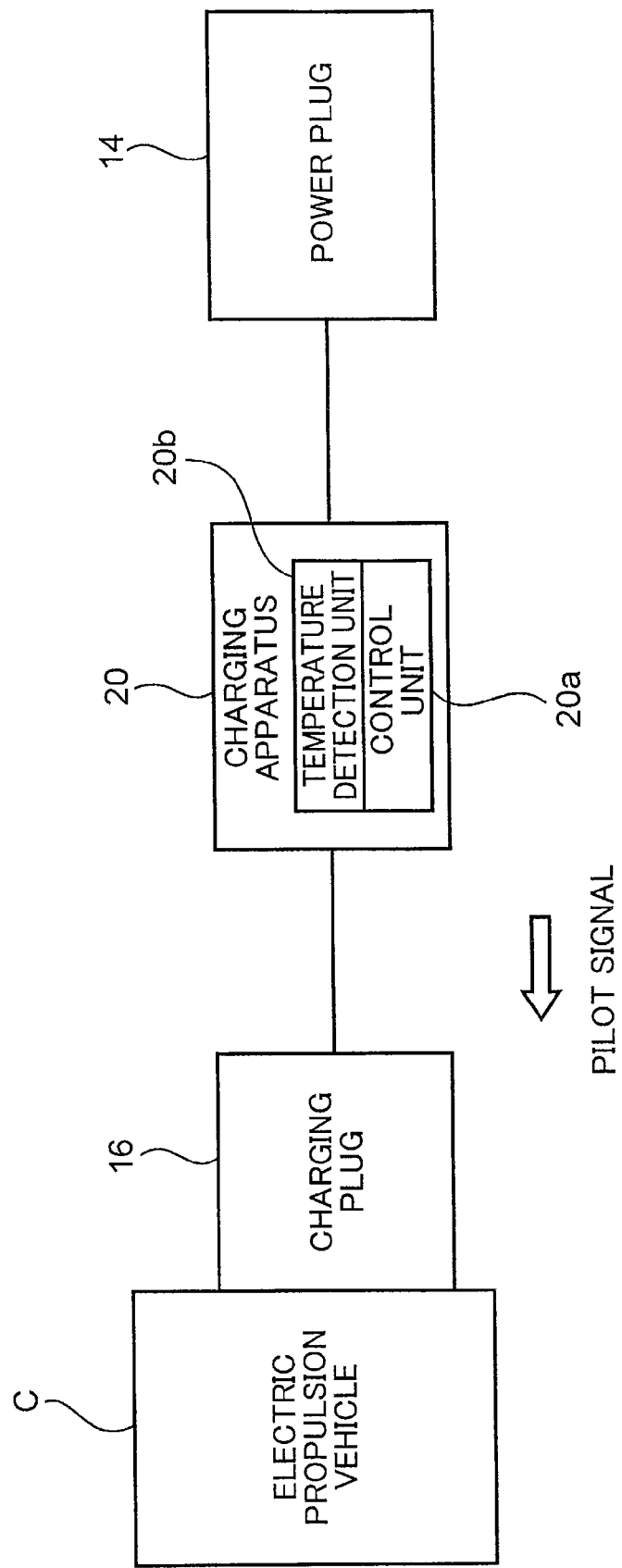
FIG. 11 is a block diagram of a charging cable according to Embodiment 7 of the present invention.

Embodiment 7 is characterized by a temperature detection unit provided in the control unit 20a. FIG. 11 is a block diagram of the charging cable A according to Embodiment 7 of the present invention. As shown in FIG. 11, a temperature detection unit 20b is located in the control unit 20a.

The electric propulsion vehicle C is expected to be charged in various situations. For example, the charging apparatus 20 may be left under the scorching sun to cause abnormal heat generation in the control unit 20a. Furthermore, abnormal heat generation may result from incomplete connection between a terminal of the control unit 20a and a terminal of the connection cable 18. Moreover, dust collected between the terminal of the control unit 20a and the terminal of the connection cable 18 may cause a tracking phenomenon, leading to abnormal heat generation.

Thus, according to Embodiment 7, the temperature detection unit 20b is located in the control unit 20a. Thus, possible abnormal heat generation in the control unit 20a can be accurately detected. Then, even if the temperature of the control unit 20a becomes equal to or higher than the specified temperature T1 to cause the electric conduction to be stopped, the electric conduction is recovered as is the case with Embodiments 1 to 5 when the temperature of the control unit 20a decreases to the specified temperature T2 or lower. Consequently, even if a slight level of abnormal heat generation occurs in the control unit 20a, a sufficient conduction time can be provided to allow the battery to be fully charged.

SUMMARY OF THE EMBODIMENTS (1) A charging cable according to the present invention is a charging cable for an electric propulsion vehicle used for charging a battery for the electric propulsion vehicle, the charging cable including a power plug detachably connected to an electric outlet for a commercial power supply, a charging plug detachably connected to the electric propulsion vehicle, a temperature detection unit that detects ambient temperature, and a control unit that generates and transmits a pilot signal for adjusting a conduction current to the battery, to the electric propulsion vehicle, wherein the control unit stops electric conduction to the battery when the detected temperature detected by the temperature detection unit is equal to or higher than a predetermined, first specified temperature, and recovers the electric conduction to the battery when the detected temperature decreases to a second specified temperature or lower, the second specified temperature being lower than the first specified temperature.

In this configuration, the temperature detection unit monitors the ambient temperature, and when the temperature is equal to or higher than the first specified temperature, the electric conduction is stopped. Subsequently, the ambient temperature continues to be monitored, and when the ambient temperature is equal to or lower than the second specified temperature, the electric conduction is recovered. Then, such a process is repeated while the charging cable is connected to the electric propulsion vehicle. Thus, compared to the conventional configuration that terminates charging when the detected temperature exceeds a certain value, the charging cable according to the present invention provides a sufficient conduction time to allow the battery to be fully charged.

This enables an increase in the possibility that, for example, if the user gets home at night and then connects the charging cable to the electric propulsion vehicle to start charging, the battery will have been fully charged by next morning when the user goes out.

(2) Preferably, to recover the electric conduction to the battery, the control unit generates a pilot signal allowing the conduction current to be reduced compared to a value used before the stop of the electric conduction.

This configuration has reduced the current value of the conduction current by the time the electric conduction is recovered. This allows suppression of an increase in temperature caused by the electric conduction, ensuring as long a period of electric conduction as possible.

(3) Preferably, each time recovering the electric conduction to the battery, the control unit generates a pilot signal allowing the conduction current to be reduced compared to a value used during a last period of electric conduction.

This configuration has reduced the conduction current before each recovery of the electric conduction. This allows further suppression of an increase in temperature caused by the electric conduction, ensuring as long a period of electric conduction as possible.

(4) Preferably, as one or more past periods of electric conduction increase, the control unit sets, to a smaller value, an amount by which the conduction current is reduced compared to a value used during the last period of electric conduction.

When the last period of electric conduction is long, this indicates that the detected temperature has a small temperature gradient. If, during the next period of electric conduction, the conduction current is reduced by a default amount, the temperature gradient of the detected temperature is unnecessarily decreased. This configuration sets the amount by which the conduction current is reduced to a smaller value as the period of electric conduction increases, thereby preventing the amount of time needed to fully charge the battery from increasing.

(5) Preferably, to recover the electric conduction to the battery, the control unit generates a pilot signal allowing the conduction current to be reduced compared to a value used during the last period of electric conduction and then allowing the resultant conduction current to be increased in stages until the detected temperature becomes equal to or higher than the first specified temperature.

This configuration increases, during the recovery, the conduction current in stages until the detected temperature becomes equal to or higher than the first specified temperature. Thus, the battery can be charged at the appropriate current value.

(6) Preferably, when a temperature gradient of the detected temperature during the period of electric conduction is equal to or larger than a predetermined specified temperature gradient, the control unit does not recover the electric conduction to the battery even when the detected temperature decreases to the second specified temperature or lower.

In this configuration, if the temperature gradient during the period of electric conduction is equal to or larger than the specified temperature gradient, indicating that a component of the charging cable is evidently damaged, the electric conduction is then terminated. Thus, security can be ensured.

(7) Preferably, the temperature detection unit is provided in the control unit.

This configuration can accurately detect abnormal heat generation in the control unit. Furthermore, even if a slight level of abnormal heat generation occurs in the control unit, a sufficient period of electric conduction can be provided to allow the battery to be fully charged.

(8) Preferably, the temperature detection unit is provided in the power plug.

This configuration can accurately detect abnormal heat generation in the power plug. Furthermore, even if a slight level of abnormal heat generation occurs in the power plug, a sufficient period of electric conduction can be provided to allow the battery to be fully charged.

(9) Preferably, the temperature detection unit is provided in the charging plug.

This configuration can accurately detect abnormal heat generation in the charging plug. Furthermore, even if a slight level of abnormal heat generation occurs in the charging plug, a sufficient period of electric conduction can be provided to allow the battery to be fully charged.

INDUSTRIAL APPLICABILITY

The charging cable according to the present invention enables safety to be ensured and allows as long a period of electric conduction as possible to be provided, and is thus useful as a charging cable for a home charging facility that charges an electric propulsion vehicle.

The invention claimed is:

1. A charging cable for charging a battery of an electric propulsion vehicle, the charging cable comprising:
    a power plug detachably connected to an electric outlet for a commercial power supply;
    a charging plug detachably connected to the electric propulsion vehicle;
    a temperature detection unit configured to detect a temperature of the charging cable; and
    a control unit configured to generate and transmit, to the electric propulsion vehicle, a pilot signal for adjusting a conduction current flowing through the battery,
    wherein the control unit is configured to disconnect electric conduction to the battery when the temperature detected by the temperature detection unit is equal to or higher than a predetermined first specified temperature, and reestablish the electric conduction to the battery when the detected temperature decreases to a second specified temperature or lower, the second specified temperature being lower than the first specified temperature, and
    when reestablishing the electric conduction to the battery, the control unit is configured to generate a pilot signal causing the conduction current to flow through the battery at a current value which is lower than that at which the conduction current flowed through the battery right before the disconnection of the electric conduction.

2. The charging cable according to claim 1, wherein, when repeating disconnection and reestablishment of the electric conduction to the battery in a series of cycles, the control unit is configured to generate a pilot signal causing the conduction current to flow through the battery during the electric conduction in a cycle at a current value which is lower than that at which the conduction current flowed through the battery during the electric conduction in an immediately preceding cycle.

3. The charging cable according to claim 2, wherein, as one or more durations of the electric conduction in past cycles become long, the control unit is configured to generate a pilot signal causing the conduction current to flow through the battery at a current value which is smaller than that at which the conduction current flowed through the battery during the electric conduction in an immediately preceding cycle.

4. The charging cable according to claim 1, wherein the temperature detection unit is provided in the control unit.

5. The charging cable according to claim 1, wherein the temperature detection unit is provided in the power plug.

6. The charging cable according to claim 1, wherein the temperature detection unit is provided in the charging plug.

7. A charging cable for charging a battery of an electric propulsion vehicle, the charging cable comprising:
    a power plug detachably connected to an electric outlet for a commercial power supply;
    a charging plug detachably connected to the electric propulsion vehicle;
    a temperature detection unit configured to detect a temperature of the charging cable; and
    a control unit configured to generate and transmit, to the electric propulsion vehicle, a pilot signal for adjusting a conduction current flowing through the battery,
    wherein the control unit is configured to disconnect electric conduction to the battery when the temperature detected by the temperature detection unit is equal to or higher than a predetermined first specified temperature, and reestablish the electric conduction to the battery when the detected temperature decreases to a second specified temperature or lower, the second specified temperature being lower than the first specified temperature, and
    wherein, when reestablishing the electric conduction to the battery, the control unit is configured to generate a pilot signal causing the conduction current to flow through the battery at a current value which is smaller than that at which the conduction current flowed through the battery during the electric conduction in an immediately preceding cycle and to increase in a stairway manner while the detected temperature rises during a predetermined period of determination in a present duration of the electric conduction by a degree equal to or smaller than a reference increase value.

8. The charging cable according to claim 7, wherein the temperature detection unit is provided in the control unit.

9. The charging cable according to claim 7, wherein the temperature detection unit is provided in the power plug.

10. The charging cable according to claim 7, wherein the temperature detection unit is provided in the charging plug.

11. A charging cable for charging a battery of an electric propulsion vehicle, the charging cable comprising:
    a power plug detachably connected to an electric outlet for a commercial power supply;
    a charging plug detachably connected to the electric propulsion vehicle;
    a temperature detection unit configured to detect a temperature of the charging cable; and
    a control unit configured to generate and transmit, to the electric propulsion vehicle, a pilot signal for adjusting a conduction current flowing through the battery,
    wherein the control unit is configured to disconnect electric conduction to the battery when the temperature detected by the temperature detection unit is equal to or higher than a predetermined first specified temperature, and reestablish the electric conduction to the battery when the detected temperature decreases to a second specified temperature or lower, the second specified temperature being lower than the first specified temperature, and
    wherein, when the temperature detected in an immediately preceding duration of the electric conduction increases at a rate equal to or larger than a predetermined specified temperature increase rate, the control unit is configured to keep the electric conduction to the battery disconnected even when the detected temperature decreases to the second specified temperature or lower.

12. The charging cable according to claim 11, wherein the temperature detection unit is provided in the control unit.

13. The charging cable according to claim 11, wherein the temperature detection unit is provided in the power plug.

14. The charging cable according to claim 11, wherein the temperature detection unit is provided in the charging plug.

* * * * *